(No Model.)
J. FÉRAUD.
FILTERING APPARATUS.
No. 513,905. Patented Jan. 30, 1894.
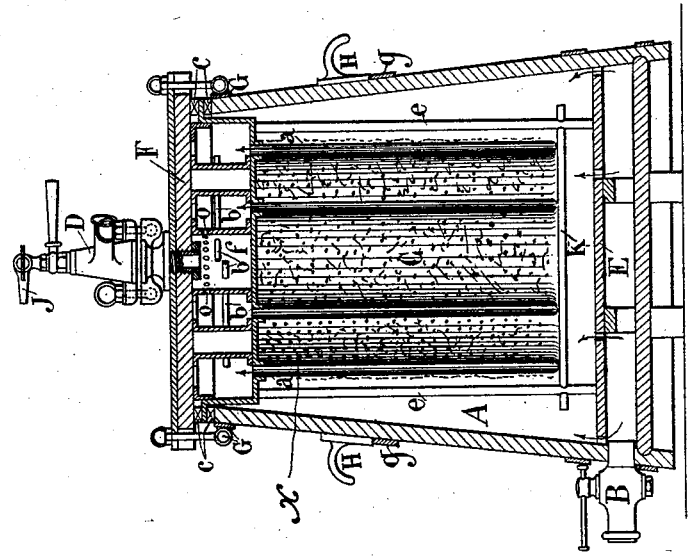
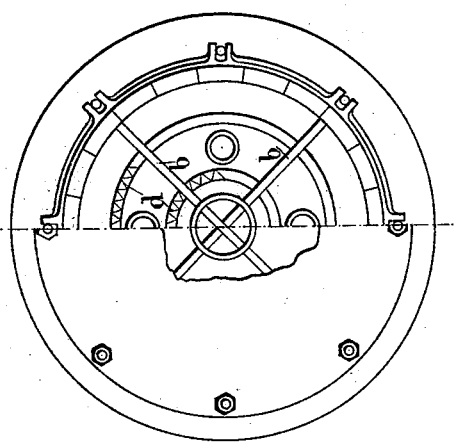
Witnesses:
E. K. Sturtevant.
A. R. Dunne.
Inventor:
Joseph Féraud,
by
attorneys.

UNITED STATES PATENT OFFICE.

JOSEPH FÉRAUD, OF PARIS, FRANCE.

FILTERING APPARATUS.

SPECIFICATION forming part of Letters Patent No. 513,905, dated January 30, 1894.

Application filed March 23, 1893. Serial No. 467,325. (No model.) Patented in France August 24, 1892, No. 223,963.

*To all whom it may concern:*

Be it known that I, JOSEPH FÉRAUD, residing at Paris, in the Republic of France, have invented certain new and useful Improvements in Filtering Apparatus, (for which I obtained a patent in France, No. 223,963, dated August 24, 1892,) of which the following is a specification.

The invention is illustrated in the drawings annexed to the specification, in which—

Figure 1, represents a plan view of my filter and my filtering system half of the cover of the filter being removed. Fig. 2, shows a vertical section through the axis of my filter and my filtering system.

In the drawings A is a receptacle of any kind, constructed of a convenient material to hold the liquid; B is a cock carrying the liquid to be filtered into the same; C the filter proper with perforated walls, of a convenient material but preferably of metal, or perforated sheet iron with meshes, located inside of the receptacle A.

D is the cock for the letting out the filtered liquid; E a double bottom consisting of two parts; F the cover with a sheet iron plate and handles with bolts for the closing of the cover.

*g* is a strengthening hoop for the case when the part A is constructed by cooperage.

H, H, are side handles.

J is a trial cock; *a*, rigid permeable or perforated walls forming a filtering support; *b* a cross stay strengthening the vessel C at its superior part; *c, c* joints of rubber or any other convenient flexible matter; *d, d* corrugated or plaited sheet iron strengthening and keeping at a distance the permeable walls through which the filtered liquid passes; *e, e*, uprights of the frame upon the lower cross beams K of which the vessel C rests; *f* central chamber into which the filtered liquid is conveyed through holes *o* to pass out from there through the cock D.

The arrows indicate the course of the liquid.

In part of the liquid to be filtered or of the filtered liquid, we dilute a convenient quantity of cellulose fibers of wool and amianthus perfectly pure and sterilized. This operation is carried out in the receptacle A out of which the vessel C has previously been removed. When the diluting and the mixing are deemed to be sufficient, the vessel C is put in its place again, the cover is closed and by opening the admission cock B the filtering matter contained in the liquid is carried along by the stream and sticks to the exterior sides of the walls of the vessel C where it felts so perfectly that after a few minutes running the liquid comes out absolutely limpid through the orifice D. The first obtained liquid must be gathered in a separate place and must be filtered over again. To that effect the cock D can have several ways. The tissue thus formed during the course of the filtering is completed by the filtration. If amianthus alone was used the flow would soon cease. It is possible, however, to obtain a tissue appropriated for the different liquids by a convenient mixing of the three kinds of fibers or even of only two kinds, wool and amianthus, as must be the case for the filtering of certain bodies not mixable with water and to make the quantity of it proportionate to the yield. Besides that, those filters from their nature itself cannot be attacked by the liquids to be filtered and they have no action upon the same; and, it is also desirable that the walls of the filtering apparatus be constructed from a material that cannot be attacked by and which have no action upon the to be filtered liquids. The thus formed tissue keeps back all impurities and is so much the sooner stopped up. At the end of a certain time, depending upon the nature of the liquid as much as upon the proportions of the filtering fibers the yield decreases considerably. At that moment the cover is removed and the permeable vessel C is raised; the felted layer that has formed itself against the walls is removed, which can easily be done by the hand. That layer is of very little value and is thrown away after the liquid that it still contains, if any, has been pressed out. I avoid by so doing two important and expensive operations, the washing off and the sterilizing of the filtering walls.

I may add some chemical effect to the filtration by the use of some powdered body, bone black or charcoal for instance, to the mentioned fibrous matter.

It will be seen that by means I have just described and illustrated and by choosing convenient materials for the constructing of the apparatus and by preparing the above mentioned fibrous matters according to the nature of the to be filtered liquid and according to the desired result and by adding, if necessary, some powdered body mixed with the mass in order to produce a disinfecting or other chemical effect, I can effect the filtering of whatsoever liquid of whatsoever nature and in whatsoever state, with the certainty that the obtained liquid will be free of every strange body and of every impurity and of whatsoever kind of microbe without it having been necessary to perform the delicate operation of washing and sterilizing the filtering walls.

The perforations are shown at X, Fig. 2.

I claim—

In combination, the outer casing, the filtering vessel comprising the concentric chambers open at the bottom to the space within the casing and closed at the top by a cross plate, the annular spaces between the chambers closed at the bottom to the space within the casing and opening at the top through the cross plate into the upper discharge space, the discharge leading from the upper space and the fibrous material felted along the opposing walls of the annular spaces, the said filtering vessel being removable substantially as described.

In witness whereof I have hereunto set my hand in presence of two witnesses.

JOSEPH FÉRAUD.

Witnesses:
L. JAEGER,
CHAS. T. GRELLET.